United States Patent
Gondo

(10) Patent No.: US 9,677,547 B2
(45) Date of Patent: Jun. 13, 2017

(54) IMPACT DRIVE TYPE ACTUATOR

(71) Applicant: SEIDENSHA CORPORATION, Sagamihara-shi, Kanagawa (JP)

(72) Inventor: Masahiko Gondo, Yamanashi (JP)

(73) Assignee: SEIDENSHA CORPORATION, Kanagawa (JP)

( * ) Notice: Subject to any disclaimer, the term of this patent is extended or adjusted under 35 U.S.C. 154(b) by 195 days.

(21) Appl. No.: 14/732,235

(22) Filed: Jun. 5, 2015

(65) Prior Publication Data

US 2015/0275867 A1   Oct. 1, 2015

Related U.S. Application Data

(62) Division of application No. 13/817,613, filed as application No. PCT/JP2011/068769 on Aug. 19, 2011, now Pat. No. 9,068,561.

(30) Foreign Application Priority Data

Aug. 20, 2010 (JP) ................. 2010-185151

(51) Int. Cl.
  *F03G 7/06* (2006.01)
  *G03B 3/10* (2006.01)
(52) U.S. Cl.
  CPC ............... *F03G 7/065* (2013.01); *G03B 3/10* (2013.01); *G03B 2205/0076* (2013.01)
(58) Field of Classification Search
  CPC .... F03G 7/065; G03B 2205/0076; G03B 3/10
  (Continued)

(56) References Cited

U.S. PATENT DOCUMENTS 4,716,731 A    1/1988 Sakai et al.
4,761,955 A *  8/1988 Bloch .................... F03G 7/065
                                         60/527
(Continued)

FOREIGN PATENT DOCUMENTS

JP   2003-003948 A   1/2003
JP   2004-308657 A   11/2004
(Continued)

OTHER PUBLICATIONS

Feb. 25, 2015 Notice of Allowance issued in U.S. Appl. No. 13/817,613.
(Continued)

*Primary Examiner* — Hoang Nguyen
(74) *Attorney, Agent, or Firm* — Oliff PLC

(57) ABSTRACT

An impact drive type actuator (10) is comprised of a wire-shaped shape memory alloy (11) which contracts upon being electrified and heated, a disk-shaped insulating heat conductor (12) which contacts this wire-shaped shape memory alloy (11) and releases the heat which is generated at the wire-shaped shape memory alloy, and a drive circuit (16, 17) which instantaneously electrifies the wire-shaped shape memory alloy and instantaneously makes the wire-shaped shape memory alloy contract. According to this impact drive type actuator, it realizes a heat conduction structure which gives rise to a high heat dispersion action by the heat characteristics of the shape memory alloy, so it becomes possible to utilize the deformation by extension and contraction of a shape memory alloy which has a wire-shaped form, improve the speed and response of the deformation operation characteristics, and improve practicality.

6 Claims, 15 Drawing Sheets

(58) Field of Classification Search
USPC .............................. 60/527–529; 310/306–307
See application file for complete search history.

(56) References Cited

U.S. PATENT DOCUMENTS

| | | | | |
|---|---|---|---|---|
| 5,685,148 | A * | 11/1997 | Robert | F03G 7/065 60/527 |
| 6,133,547 | A | 10/2000 | Maynard | |
| 6,574,958 | B1 * | 6/2003 | MacGregor | F03G 7/065 374/E5.031 |
| 7,188,473 | B1 * | 3/2007 | Asada | H02N 11/006 310/306 |
| 7,451,595 | B2 * | 11/2008 | Komori | F03G 7/065 60/527 |
| 7,975,477 | B2 * | 7/2011 | Wakahara | F03G 7/06 310/306 |
| 2006/0201149 | A1 | 9/2006 | Biggs et al. | |
| 2013/0154984 | A1 | 6/2013 | Gondo | |

FOREIGN PATENT DOCUMENTS

| | | | |
|---|---|---|---|
| JP | 2005-155427 | A | 6/2005 |
| JP | 2005-226456 | A | 8/2005 |
| JP | 2006-166555 | A | 6/2006 |
| JP | 2009-109907 | A | 5/2009 |

OTHER PUBLICATIONS

International Search Report and Opinions of International Search Agency; International Application No. PCT/JP2011/06869; International Filing Date: Aug. 19, 2011.

* cited by examiner

IMPACT DRIVE TYPE ACTUATOR

This is a Division of Application No. 13/817,613 filed Feb. 19, 2013, which in turn is a National Phase of Application No. PCT/JP2011/068769, filed Aug. 19, 2011. The disclosures of the prior applications are hereby incorporated by reference herein in their entirety.

TECHNICAL FIELD

The present invention relates to an impact drive type actuator, more particularly relates to an impact drive type actuator which utilizes the change by extension and contraction in the length direction of a shape memory alloy which has a wire-shaped form so as to enable an impact-like motion (impact operation) in a horizontal direction (or planar direction) or a vertical direction (front-back direction or thickness direction) and a rotational operation or linear operation based on repetition of the impact operation.

BACKGROUND ART

As an actuator which utilizes a shape memory alloy, in the past there have been the actuators which are described in the Patent Literatures 1 to 3.

The Patent Literature 1 proposes a technique for designing a shape memory alloy actuator which has a two-way shape memory effect which enables the shape memory alloy actuator to withstand repeated operation a very large number of times, be strikingly lengthened in operating lifetime, be broadened in range of operation, and further be stabilized in shape. The "two-way shape memory effect" is the phenomenon whereby if deforming a shape memory alloy which memorizes a certain shape at a low temperature, then heating it, the alloy returns to its original memorized shape and, furthermore, if making it low in temperature, the alloy returns to the shape deformed to at the low temperature. With the two-way shape memory effect, by just heating and cooling, the shape memory alloy independently repeatedly changes in shape without requiring action of a bias force from the outside. In a shape memory alloy actuator which has a two-way shape memory effect, behavior storing two shapes—the shape deformed to at the time of a low temperature (shape in martensite state) and the shape returned to at the time of a high temperature (shape in matrix phase state)—is exhibited.

In a shape memory alloy actuator which is described in the Patent Literature 2, a plurality of shape memory alloy wires are arranged between a support member and a moving member—both flat plates in shape. These shape memory alloy wires are laid so as to contact mating parts formed at facing surfaces of the support member and moving member and, furthermore, so as to bridge them in a loose manner. The moving member is given external force from the outside to be pushed against the support member. The shape memory alloy wires are in a loose state at ordinary temperature. When electrified and heated, they contract to tense up and are extended straight whereby the moving member is moved.

In a drive device which is disclosed in the Patent Literature 3, there is provided an actuator which has a shape memory alloy wherein the speed of response is raised. In this actuator, the shape memory alloy is supplied with a drive current and made to generate heat to cause a return operation. Furthermore, control is performed to generate an amount of drive current for the shape memory alloy so as to give an amount of displacement of the shape memory alloy based on a target value of displacement of the moving member. The invention which is disclosed in the Patent Literature 3 is therefore a drive device which is constituted by an actuator which has a shape memory alloy which efficiently increases the speed of response of the actuator.

PRIOR ART LITERATURE

Patent Literature

Patent Literature 1: Japanese Patent Publication No. 2003-003948 A1
Patent Literature 2: Japanese Patent Publication No. 2005-226456 A1
Patent Literature 3: Japanese Patent Publication No. 2006-166555 A1

SUMMARY OF INVENTION

Technical Problems

An actuator which utilizes a shape memory alloy performs a drive operation by utilizing the behavior of a shape memory alloy of memorizing a change in shape between a shape which it deforms to at the time of a low temperature (at the time of ordinary temperature) and a shape which it recovers to at the time of a high temperature (at the time of being electrified and generating heat). The response of the behavior of the shape memory alloy depends on the change in the heat state from the time of a high temperature to the time of a low temperature. An actuator which utilizes a conventional shape memory alloy does not sufficiently consider the change in the heat state from the time of a high temperature to the time of a low temperature, so had the defects of a low response in operation and a low practicality.

An object of the present invention, in consideration of the problem, is to provide an impact drive type actuator which considers the heat characteristics of a shape memory alloy and realizes a heat conduction structure giving rise to a high heat dispersion action so as to utilize extension and contraction deformation of a shape memory alloy which has a wire-shaped form, improve the speed and response of the deformation operation characteristics, and improve the practicality.

Solution to Problem

The impact drive type actuator according to the present invention is constituted as follows to achieve the object.

The impact drive type actuator according to the present invention is characterized by being provided with a wire-shaped shape memory alloy which contracts upon being electrified and heated, an insulating heat conductor which contacts the wire-shaped shape memory alloy and releases the heat which is generated at the wire-shaped shape memory alloy, and a drive circuit which instantaneously electrifies the wire-shaped shape memory alloy to make the wire-shaped shape memory alloy contract.

In the impact drive type actuator, the wire-shaped shape memory alloy which is arranged in a predetermined laid out state is provided with an insulating heat conductor which is made to contact the wire-shaped shape memory alloy so as to quickly disperse and release the heat which was generated at the shape memory alloy, so it is possible to quickly release the heat which was generated by heat emission due to the instantaneous electrification and possible to quickly lower the temperature of the wire-shaped shape memory alloy.

In the above constitution, preferably the insulating heat conductor at least partially has a substantially circumferential shape, the wire-shaped shape memory alloy is arranged so as to contact the circumferential surface of the insulating heat conductor, and the wire-shaped shape memory alloy makes the insulating heat conductor displace in position when electrified and contracts.

The heat which is generated at the wire-shaped shape memory alloy at the time of electrification is dispersed by utilizing the entire area of a substantially half circle part of the circumferential surface of the insulating heat conductor, so the path for release of heat can be enlarged and the wire-shaped shape memory alloy can quickly drop in temperature. Further, by utilization in a half circle shape and by having the wire-shaped shape memory alloy as a whole abut against the half circle part of the circumferential surface of the insulating heat conductor, the contraction operation of the wire-shaped shape memory alloy can be converted into movement of the insulating heat conductor in the radial direction and as a drive part which enables impact in the radial direction use of the insulating heat conductor is possible.

In the above constitution, preferably the circumferential surface of the insulating heat conductor is formed with a groove, and the wire-shaped shape memory alloy is arranged in the groove. The groove is, for example, one with a V-shaped cross-section. The wire-shaped shape memory alloy is arranged so as to contact the two wall surfaces of the V-shaped groove, so the heat dispersion function can be improved.

In the above constitution, preferably the insulating heat conductor is comprised of two component members which face each other substantially in parallel and have pluralities of mating projecting parts, the wire-shaped shape memory alloy is arranged between the two component members so as to contact the the matingn projecting parts, and the wire-shaped shape memory alloy changes an interval between the two component members when it is electrified and contracts. According to this constitution, the contraction operation of the wire-shaped shape memory alloy can be converted to movement (displacement) of plate members in a direction perpendicular to the surfaces of the plate members and the interval between the two component members can be changed.

In the above constitution, preferably the insulating heat conductor is comprised of two component members which face each other substantially in parallel and have substantially rod shapes or pipe shapes, the wire-shaped shape memory alloy is spirally wound around the two component members to contact their circumference, and the wire-shaped shape memory alloy makes the two component members displace so as to reduce the interval between them when it is electrified and contracts.

The two component members of the insulating heat conductor are arranged at a distance from each other. The distance is maintained by having one component member elastically supported. One is fixed in place and the elastically supported other is made movable. In this state, the wire-shaped shape memory alloy is made to contract whereby the other component member is displaced to approach the one fixed component member.

In the above constitution, preferably the wire-shaped shape memory alloy is wound in a ring shape or a figure eight shape. In a constitution where it is wound in a figure eight shape, it is possible to increase the contact area between the wire-shaped shape memory alloy and the surface of the rod-shaped insulating heat conductors and therefore possible to improve the ability to disperse the heat generated by electrification.

In the above constitution, preferably the two component members of the insulating heat conductor are respectively comprised so that at least the outer surfaces which contact the wire-shaped shape memory alloy are curved so that their cross-sections include substantially half circles.

In the above constitution, preferably the insulating heat conductor is formed as a rotor which is provided freely rotatably, the wire-shaped shape memory alloy is provided contacting and winding around the circumferential surface of the insulating heat conductor and is fastened at its two ends, and the wire-shaped shape memory alloy tightens against the insulating heat conductor and brakes its rotational operation when it is electrified and contracts. In the above constitution, the contraction action of the wire-shaped shape memory alloy can be utilized as means for braking rotational operation of the rotor.

In the above constitution, preferably the insulating heat conductor is formed as a rotor which is provided freely rotatably, its circumferential surface being formed with a spiral shaped groove, the wire-shaped shape memory alloy is provided contacting the inside of the groove and winding around the circumferential surface of the insulating heat conductor, one end being fixed and the other end being supported by an elastic mechanism to be tensed, and the wire-shaped shape memory alloy makes the insulating heat conductor rotate when when it is electrified and contracts.

In the above constitution, use is possible as an impact drive type actuator which repeatedly makes the wire-shaped shape memory alloy contract in a short time and utilizes the engagement relationship with the spiral shaped groove which is formed at the circumferential surface of the rotor insulating heat conductor so as to make the rotor insulating heat conductor turn in any direction.

In the above constitution, preferably, separate from the wire-shaped shape memory alloy, a second wire-shaped shape memory alloy is provided, the second wire-shaped shape memory alloy is provided contacting the inside of the groove at the circumferential surface of the insulating heat conductor and winding in a direction opposite to the winding direction of the wire-shaped shape memory alloy, one end being fixed and the other end being supported by a second elastic mechanism to be tensed, and the wire-shaped shape memory alloy makes the insulating heat conductor turn in one direction when it is electrified and contracts while the second wire-shaped shape memory alloy makes the insulating heat conductor turn in the opposite direction when it is electrified and contracts.

In the above constitution, by utilizing two wire-shaped shape memory alloys, rotation in two directions—the clockwise direction and counterclockwise direction—becomes possible.

In the above constitution, preferably the groove which is formed at the circumferential surface of the insulating heat conductor is a spiral shaped thread groove, and this thread groove is structured so that the wire-shaped shape memory alloy does not contact itself.

In the above constitution, preferably the insulating heat conductor has a plate-shaped form, two plate-shaped insulating heat conductors are arranged facing each other, one plate-shaped insulating heat conductor being fixed in place, the other plate-shaped insulating heat conductor being arranged to be freely movable and being provided to be pulled in one direction by an elastic mechanism, the wire-shaped shape memory alloy is arranged between the two plate-shaped insulating heat conductors so that the wire-shaped shape memory alloy connects the two plate-shaped insulating heat conductors, and the wire-shaped shape memory alloy makes the freely movable plate-shaped insulating heat conductor displace by exactly a predetermined distance against the elastic mechanism when it is electrified and contracts.

In the above constitution, preferably a moving member is arranged on top of the freely movable plate-shaped insulating heat conductor in a friction contact state and the freely movable plate-shaped insulating heat conductor is repeatedly made to displace whereby the moving member is made to move in one direction.

In the above constitution, preferably the drive circuit is comprised of a booster circuit which converts input voltage to a high voltage, a capacitor which is charged by that output voltage, and a switching device which is connected in series with the wire-shaped shape memory alloy from said capacitor and instantaneously runs current to the wire-shaped shape memory alloy.

In the above constitution, preferably the insulating heat conductor is constituted by aluminum oxide (alumina) or aluminum nitride at least at the surface part which contacts the wire-shaped shape memory alloy.

Furthermore, in the above constitution, preferably the insulating heat conductor is comprised of two component members which face each other substantially in parallel and which are provided with pluralities of projecting members, at each of the two component members, the plurality of projecting members are separated, the plurality of projecting members are comprised of conductive members, and between the two component members, the wire-shaped shape memory alloy is arranged so as to contact parts comprised of the conductive members of the projecting members, and the wire-shaped shape memory alloy changes the interval of the two component members when it is electrified and contracts.

Advantageous Effects of Invention

According to the impact drive type actuator according to the present invention, a wire-shaped shape memory alloy which is arranged in a predetermined laid out state is provided with various shapes of insulating heat conductors in a manner enabling as much effective contact as possible. Due to these insulating heat conductors, heat which was generated at the wire-shaped shape memory alloy due to the pulse-like electrification is quickly dispersed and released, so the wire-shaped shape memory alloy can be quickly lowered in temperature, instantaneous operation able to be repeated in a relatively short time can be realized, and a highly practical impact drive type actuator can be achieved.

DESCRIPTION OF EMBODIMENTS

Below, preferred embodiments (examples) of the present invention will be explained with reference to the drawings.

[First Embodiment]

Referring to FIG. 1 to FIG. 4, a first embodiment of an impact drive type actuator according to the present invention will be explained. In the figures, 10 indicates an impact drive type actuator, 11 a wire-shaped shape memory alloy, and 12 an insulating heat conductor which has a disk shape (below, referred to as a "disk-shaped insulating heat conductor 12"). The wire-shaped shape memory alloy 11 has a predetermined length which is required for forming the impact drive type actuator 10. In practice, the wire-shaped shape memory alloy 11 may have any wire size and wire length. These are suitably determined in accordance with the size of the impact drive type actuator 10 as a whole being prepared. Further, the disk-shaped insulating heat conductor 12 is typically formed by aluminum oxide (alumina) and preferably has a high electrical insulating property and heat conductivity. Note that the disk-shaped insulating heat conductor 12 may have as little as the surface part which contacts the wire-shaped shape memory alloy 11 made of aluminum oxide. In this case, for example, the disk-shaped insulating heat conductor 12 as a whole is made of aluminum and just the required surface part is changed to aluminum oxide. The aluminum oxide surface is formed by a process similar to electroplating, that is, anodic oxidation, but is much harder than the original aluminum so has the preferable properties of an increased surface hardness and improved wear resistance. Further, as the material of the disk-shaped insulating heat conductor 12, aluminum nitride or diamond may also be used. Aluminum nitride or diamond is better in heat conductivity than aluminum oxide and, if ignoring the cost, is a more suitable material.

Furthermore, regarding the term "insulating heat conductor", this member is generally made of a conductive material. To impart an insulating property, it is also possible to split the conductive material into several sections and perform treatment or processing to secure an insulating property seen overall.

Figure 1:
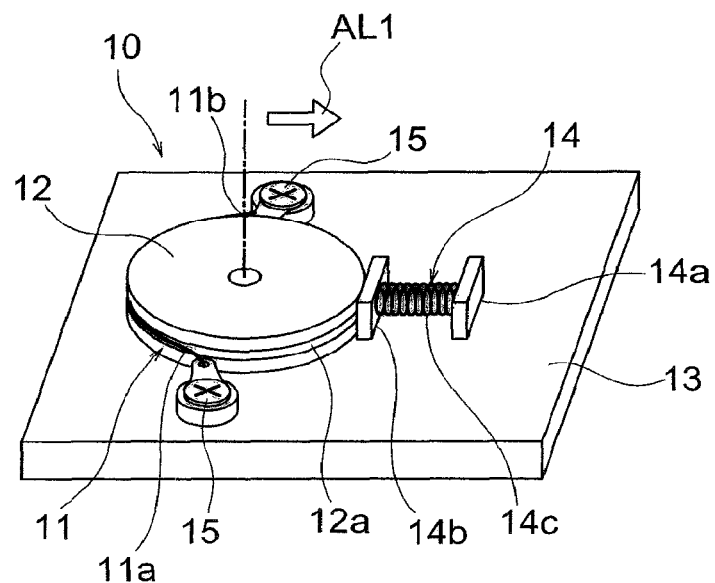
FIG. 1 This is a perspective view which shows the appearance of principal parts of an impact drive type actuator according to a first embodiment of the present invention.

The disk-shaped insulating heat conductor 12 is, for example, provided on a base member 13 and, as shown in FIG. 1 etc., is attached by a structure enabling the contraction action of the wire-shaped shape memory alloy 11 to cause it to move in the direction of the arrow AL1 (any linear direction in plane). The disk-shaped insulating heat conductor 12 is supported by an elastic mechanism 14 so as to be pressed in a direction opposite to the arrow AL1. The elastic mechanism 14 is constituted by an end part 14a which is fastened to the base member 13, an end part 14b which contacts one location of the circumferential surface of the disk-shaped insulating heat conductor 12 and is able to move to push that location, and a coil spring member 14c which is arranged between the two ends 14a, 14b and is provided in a required compressed state. Due to the extension action of the coil spring member 14c, the moving end part 14b pushes against the circumferential surface of the disk-shaped insulating heat conductor 12.

Figure 3:
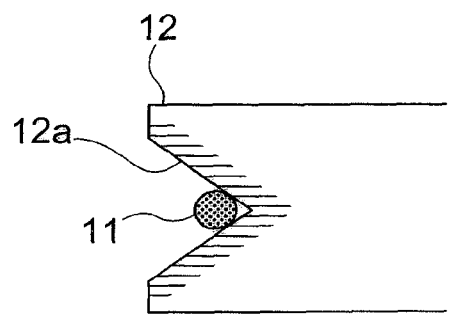
FIG. 3 This is a partial cross-sectional view which shows a state of contact of a wire-shaped shape memory alloy and a disk-shaped insulating heat conductor in the impact drive type actuator according to the first embodiment.

A predetermined length of the wire-shaped shape memory alloy 11 is arranged so as to contact substantially half the region of the circumferential surface of the disk-shaped insulating heat conductor 12 (half circle curved surface). The two ends 11a, 11b of the wire-shaped shape memory alloy 11 are fastened to the base member 13 by screws 15 or other electrical terminals. The wire-shaped shape memory alloy 11, as shown in FIG. 3, is arranged inside of a groove 12a which is formed with for example a V-shaped cross-section in the circumferential direction of the circumferential surface of the disk-shaped insulating heat conductor 12. Substantially the entire part of the wire-shaped shape memory alloy 11 is present inside the groove 12a and contacts the groove surfaces. In the usual extended state of the wire-shaped shape memory alloy 11, the disk-shaped insulating heat conductor 12 is pushed by the elastic mechanism 14 in the opposite direction of the arrow AL1, so substantially the entire region of the wire-shaped shape memory alloy 11 is in a state firmly contacting the groove surfaces of the groove 12a.

Figure 4:
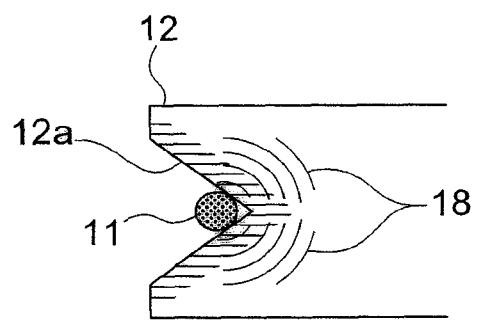
FIG. 4 This is a partial cross-sectional view which shows a state of heat dispersion through contact of the wire-shaped shape memory alloy and the disk-shaped insulating heat conductor in the impact drive type actuator according to the first embodiment.

As shown in FIGS. 2(A) and (B), the two ends 11a and 11b of the wire-shaped shape memory alloy 11 are connected through a switch 16 to a power source 17. The switch 16 and the power source 17 for an electrical drive circuit for making the wire-shaped shape memory alloy 11 contract. The switch 16 is generally a semiconductor switch and is controlled to turn on/off by a pulse signal. As shown in FIG. 2(B), if the switch 16 is turned on in the required short time, the wire-shaped shape memory alloy 11 is instantaneously electrified. Due to this electrification, heat is instantaneously generated. As a result, the wire-shaped shape memory alloy 11 is instantaneously driven to contract. For this reason, as shown in FIG. 1 and FIG. 2(A), the disk-shaped insulating heat conductor 12 is instantaneously displaced in position in the direction of the arrow AL1 by exactly the distance "d" so as to compress the coil spring member 14c against the pressing force of the elastic mechanism 14. If intermittently electrifying the wire-shaped shape memory alloy 11, the heat due to the electrification causes the wire-shaped shape memory alloy 11 to intermittently contract. The wire-shaped shape memory alloy 11 contracts by about 4% with respect to its original length. When the wire-shaped shape memory alloy 11 is no longer electrified, as shown in FIG. 4, the heat conduction action 18 by the disk-shaped insulating heat conductor 12 causes the heat which was generated at the wire-shaped shape memory alloy 11 to rapidly disperse. As a result, the wire-shaped shape memory alloy 11 immediately returns to the original length state (extended state). In this way, in the wire-shaped shape memory alloy 11, contraction can be performed instantaneously in a relatively short time interval.

According to the impact drive type actuator 10 according to the first embodiment which has the above constitution, the wire-shaped shape memory alloy 11 generates heat and contracts each time it is intermittently electrified and makes the disk-shaped insulating heat conductor 12 displace in position by exactly the distance "d" against the force of the elastic mechanism 14. After the end of the electrification, the generated heat is dispersed by the heat conduction action of the disk-shaped insulating heat conductor 12, so the wire-shaped shape memory alloy 11 quickly extends and the pushing action of the elastic mechanism part 14 causes the disk-shaped insulating heat conductor 12 to return to its original position. In this way, the impact drive type actuator 10 performs an impact drive operation.

Figure 2:
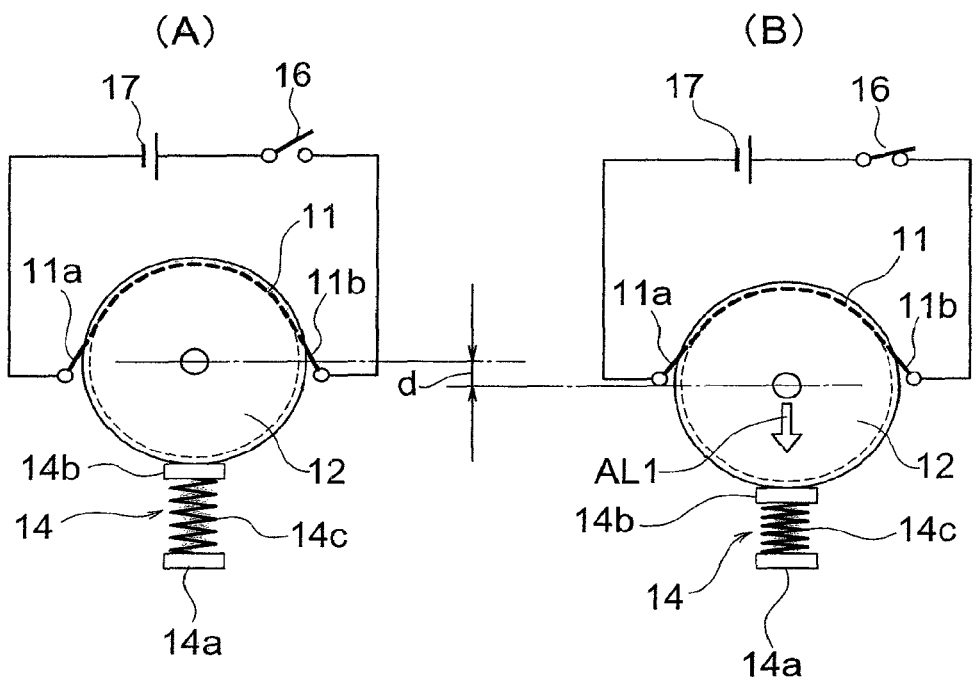
FIG. 2 This gives plan views which show a state (A) of the impact drive type actuator according to the first embodiment when the wire-shaped shape memory alloy is at a low temperature and a state (B) where it is electrified and heated (high temperature).

In the disk-shaped insulating heat conductor 12, the planar shape of the surface which contacts the wire-shaped shape memory alloy 11 is made disk shaped for the following reason. The wire-shaped shape memory alloy 11 is run through by current to contract resulting in movement of the disk-shaped insulating heat conductor, but a shape where even in the state after movement, the wire-shaped shape memory alloy 11 firmly contacts the disk-shaped insulating heat conductor at most parts generally is a circular shape with a curve. In FIG. 2, (A) shows the state before the wire-shaped shape memory alloy 11 contracts and (B) the state after it contracts. In both states, the parts where the wire-shaped shape memory alloy 11 and the disk-shaped insulating heat conductor 12 contact are almost the same. If, for example, the disk-shaped insulating heat conductor 12 were made a square shape formed by straight lines, movement of the disk-shaped insulating heat conductor 12 would be accompanied with the wire-shaped shape memory alloy 11 separating from it as a whole and the heat dispersion property remarkably deteriorating, so the result would no longer be suitable for this application.

In the above, the insulating heat conductor 12 was explained as preferably being disk shaped, but while not shown, it may also be an insulating heat conductor which has a substantially circumferential shape in only part. The point is that so long as the part which the wire-shaped shape memory alloy 11 contacts is substantially circumferential in shape, the inherent operation as an actuator becomes completely the same.

[Second Embodiment]

Figure 5:
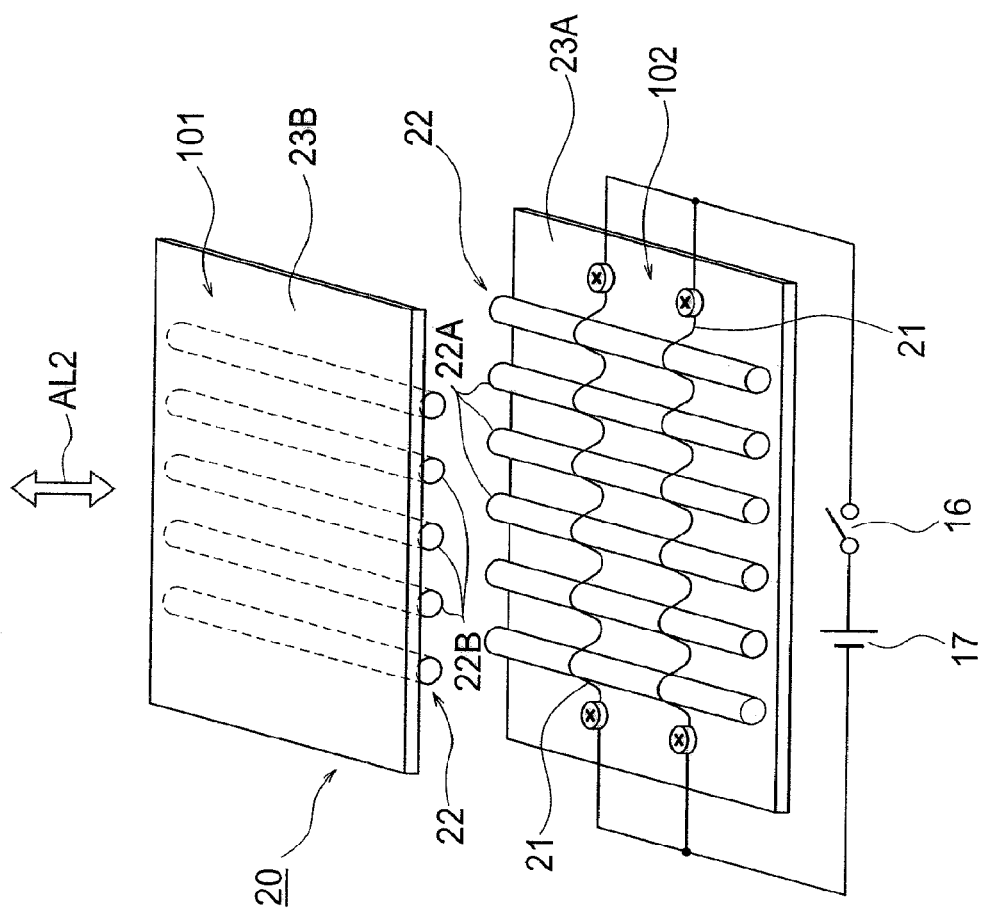
FIG. 5 This is a perspective view which shows the appearance of principal parts of an impact drive type actuator according to a second embodiment of the present invention.
Figure 6:
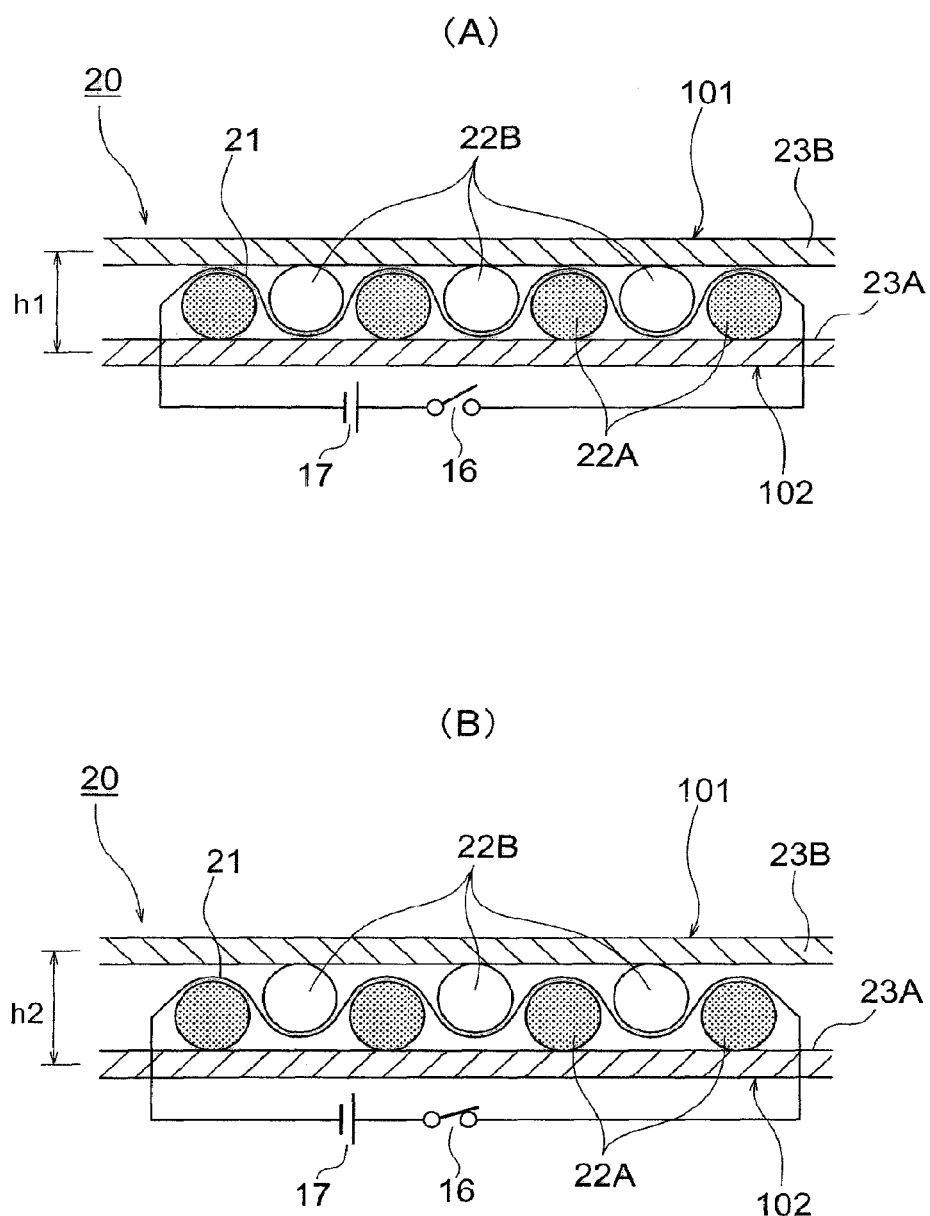
FIG. 6 This gives end views which show a state (A) of the impact drive type actuator according to the second embodiment when the wire-shaped shape memory alloy is at a low temperature and a state (B) where it is electrified and heated (high temperature).

Referring to FIG. 5 and FIG. 6, a second embodiment of the impact drive type actuator according to the present invention will be explained. In the figures, 20 indicates an impact drive type actuator, 21 a wire-shaped shape memory alloy, 22 for example, round rod shaped (columnar shape or pipe shape or other cross-sectional shape member) insulating heat conductors (below, referred to as representatively "round rod-shaped insulating heat conductors 22"), and 23A, 23B plate members. Regarding the two plate members 23A and 23B, the bottom side plate member 23A in FIG. 5 is a fixed side plate member, while the top side plate member 23B in the figure is the moving side plate member. The two plate members 23A and 23B are arranged in parallel and facing each other. The position of the plate member 23A does not change, but the plate member 23B is provided so as to be able to move in the direction of the arrow AL2 (up-down direction, thickness direction, or direction perpendicular to plate members 23A and 23B).

Between the two plate members 23A and 23B a plurality of round rod-shaped insulating heat conductors 22 are arranged in a parallel arrangement. The plurality of round rod-shaped insulating heat conductors 22 are divided into fixed side round rod-shaped insulating heat conductors 22A and moving side round rod-shaped insulating heat conductors 22B.

On the fixed side plate member 23A, the plurality of fixed side round rod-shaped insulating heat conductors 22A are arranged and fixed in parallel separated by predetermined distances. On the moving side plate member 23B, the plurality of moving side round rod-shaped insulating heat conductors 22B are arranged and fixed in parallel separated by predetermined distances. The fixed side and moving side round rod-shaped insulating heat conductors 22A and 22B are, as shown in FIG. 6, alternately arranged. The numbers of the fixed side and moving side round rod-shaped insulating heat conductors 22A and 22B are substantially equal. Between the fixed side round rod-shaped insulating heat conductors 22A and the moving side round rod-shaped insulating heat conductors 22B, at least one wire-shaped shape memory alloy 21 is arranged so as to intersect the round rod-shaped insulating heat conductors in the long direction (preferably perpendicularly). In other words, the wire-shaped shape memory alloy 21 is arranged so as to contact the plurality of mating projecting parts which are formed by the fixed side round rod-shaped insulating heat conductors 22A and the moving side round rod-shaped insulating heat conductors 22B between the two plate members 23A, 23B. The two ends of the wire-shaped shape memory alloy 21 are fastened to the fixed side plate member 23A. The fixed side round rod-shaped insulating heat conductors 22A are arranged at the fixed side plate member 23A side of the wire-shaped shape memory alloy 21, while the moving side round rod-shaped insulating heat conductors 22B are arranged at the moving side plate member 23B. The plate member 23A and the plurality of round rod-shaped insulating heat conductors 22A form the fixed side first component member 101, while the plate member 23B and the plurality of round rod-shaped insulating heat conductors 22B form the moving side second component member 102.

In the illustrated example which is shown in FIG. 5, the first component member 101 and the second component member 102 are comprised of respectively separate elements of the plate members 23A and 23B and the pluralities of round rod-shaped insulating heat conductors 22A and 22B, but these elements may be produced by integral shaping by cutting aluminum or other metal materials and maybe treated by alumite on their surfaces. Furthermore, the integrally shaped first and second component members may be worked to be separated as projecting members corresponding to the round rod-shaped insulating heat conductors 22A, 22B, then configured as the first and second component members. In the case of this constitution, it is possible to omit the alumite treatment of the surface for giving an insulation property. By separation in this way, it is possible to secure an insulation property between adjoining projecting members and use the component member 101 and component member 102 as a whole as insulating heat conductors.

The wire-shaped shape memory alloy 21 is intermittently electrified by the switch 16 and the power source 17.

In the state where the wire-shaped shape memory alloy 21 is not electrified, as shown in FIG. 6(A), the interval of the two plate members 23A and 23B is in the state of h1. Between the two plate members 23A, 23B, a coil spring member (not shown) is provided for tensing the two whereby the interval h1 is maintained. When the wire-shaped shape memory alloy 21 is electrified, as shown in FIG. 6(B), the wire-shaped shape memory alloy 21 contracts, the round rod-shaped insulating heat conductors 22B are made to displace upward against the coil spring member in the tensed state, and the interval between the two plate members 23A and 23B is enlarged to give the interval h2.

According to the impact drive type actuator 20 according to the second embodiment which has the above constitution, each time the wire-shaped shape memory alloy 21 is intermittently electrified, it generates heat and contracts and makes the moving side round rod-shaped insulating heat conductors 22B and plate member 23A displace in position so that the interval between the two plate members 23A, 23B becomes larger. After finishing electrification, the heat which is generated is dispersed by the heat conduction action of the plurality of round rod-shaped insulating heat conductors 22 (22A, 22B), so the wire-shaped shape memory alloy 21 quickly extends and, due to the pushing action of the elastic mechanism, the round rod-shaped insulating heat conductors 22B and plate member 23A return to their original positions. In this way, the impact drive type actuator 20 performs an impact drive operation in the up-down direction.

Above, the explanation was given of the fact that if the wire-shaped shape memory alloy 21 is electrified, the interval between the first component member 101 and the second component member 102 becomes larger, but by changing it as follows in FIG. 6, the wire-shaped shape memory alloy 21 can be electrified to make the interval contract small.

That is, while not shown, the wire of the wire-shaped shape memory alloy 21 of FIG. 6 is laid from the left to form peak and valley shapes which contact the round rod-shaped insulating heat conductors 22A and 22B. This is changed to form valley and peak shapes from the left so as to contact the round rod-shaped insulating heat conductors 22A and 22B. However, in this case, it is necessary to provide through holes through which the wire-shaped shape memory alloy 21 passes in the plate members 23A and 23B. In this case, opposite from the above, between the two plate members 23A, 23B, coil spring members (not shown) are provided which expand the space between the two whereby a broader interval is maintained before the wire-shaped shape memory alloy is electrified.

Further, in the above explanation, the explanation was given of the use of two wire-shaped shape memory alloys 21, but there may be just one or may be more than two wire-shaped shape memory alloy parts 21 as well. Furthermore, the round rod-shaped insulating heat conductors 22 (22A, 22B) need only contact the wire-shaped shape memory alloys 21 by the minimum lengths, so it is possible to reduce the width of the impact drive type actuator 20 as a whole.

Further, in the above explanation, the members which are shown by reference numeral 22 were explained as round rod-shaped insulating heat conductors. However, the members 22 may also be heat conductors which have the property of carrying current at their surfaces, but are electrically insulated from adjoining members (component members which are formed by projecting members and correspond to "insulating heat conductors"). In this case, the cross-sectional shape of the insulating heat conductors is not limited to a round, pipe, or other shape. Any shape which forms projecting parts may be used. Furthermore, at this time, for the surface material, copper or aluminum or other metal (conductive member) may be used. In this case, the wire-shaped shape memory alloy 21 is electrically short-circuited at the parts contacting the members 22 (surface metal parts) so no heat is generated due to electrification. In the wire-shaped shape memory alloy 21, the part which generates heat due to electrification is the part in the section between locations which adjoining two insulating heat conductors contact. By adopting such a structure for the members 22, it is possible to lower the equivalent electrical resistance, improve the heat conduction efficiency, and, furthermore, drive the impact drive type actuator according to the present invention at a low voltage.

[Third Embodiment]

Figure 7:
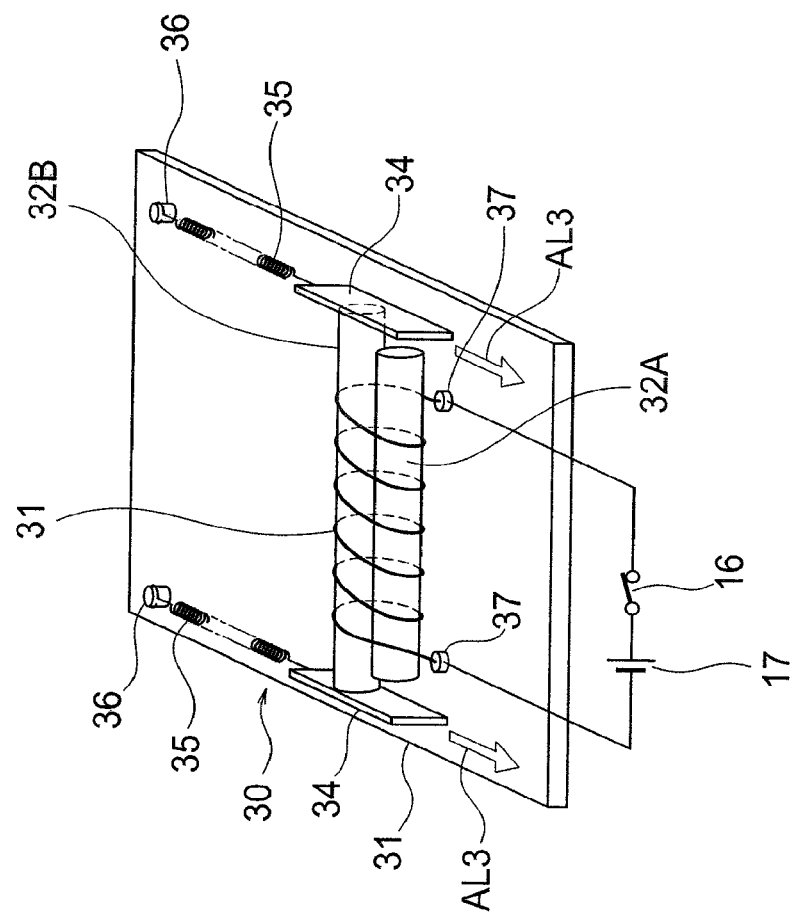
FIG. 7 This is a perspective view which shows the appearance of principal parts of an impact drive type actuator according to a third embodiment of the present invention.

Referring to FIG. 7 to FIG. 11, a third embodiment of the impact drive type actuator according to the present invention will be explained. In FIG. 7, 30 indicates an impact drive type actuator, 31 a wire-shaped shape memory alloy, and 32A and 32B rod-shaped (columnar, prismatic, pipe shape, etc.) insulating heat conductors (below, referred to as "rod-shaped insulating heat conductors 32A and 32B"). In the impact drive type actuator 30 of the present embodiment, there are two rod-shaped insulating heat conductors 32A, 32B. One rod-shaped insulating heat conductor 32A is fixed at its two ends to a base member 33, while the other rod-shaped insulating heat conductor 32B is arranged to be freely movable. The freely movable rod-shaped insulating heat conductor 32B is fixed at its two ends to support plates 34. Furthermore, the two support plates 34 at the two ends are connected through coil spring members 35 in tensed states to fastening terminals 36 on the base member 33. The two rod-shaped insulating heat conductors 34A, 34B are arranged in parallel across a predetermined interval . A wire-shaped shape memory alloy 31 is wound a plurality of turns in a spiral in a ring shape around the two rod-shaped insulating heat conductors 34A, 34B so as to contact the outside circumferences. The two ends of the wire-shaped shape memory alloy 31 are connected to electrical terminals 37 which are provided at the base member 33. Furthermore, between the two ends of the wire-shaped shape memory alloy 31, a switch 16 and a power source 17 are connected.

The two rod-shaped insulating heat conductors 32A and 32B are respectively basic component members for constituting the impact drive actuator 30 according to the present embodiment.

Figure 8:
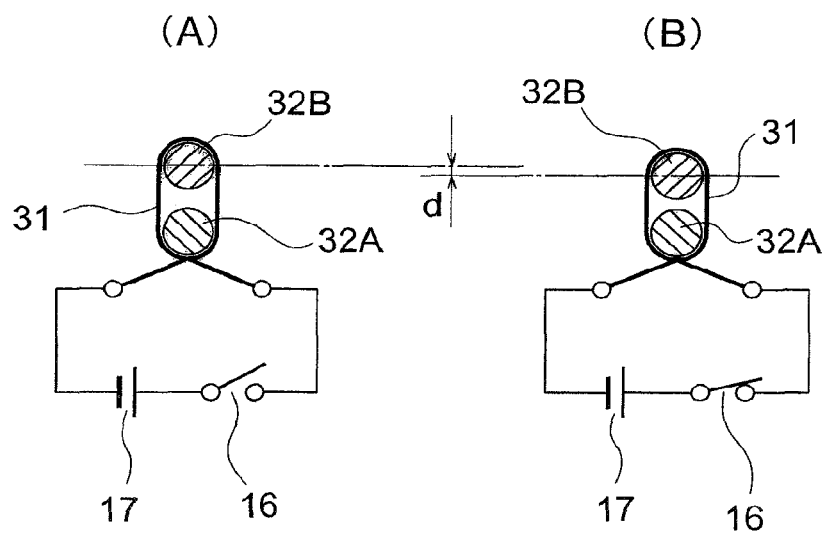
FIG. 8 This gives plan views which show a state (A) of the impact drive type actuator according to the third embodiment when the wire-shaped shape memory alloy is at a low temperature and a state (B) where it is electrified and heated (high temperature).

The freely movable rod-shaped insulating heat conductor 32B is tensed in state by the coil spring members 35, but since the wire-shaped shape memory alloy 31 is wound around it in a spiral manner, in the state where the wire-shaped shape memory alloy 31 is not electrified, it is arranged at a predetermined interval from the fixed rod-shaped insulating heat conductor 32A as shown in FIG. 8(A). When the switch 16 is turned on and the wire-shaped shape memory alloy 31 is electrified, the wire-shaped shape memory alloy 31 contracts, the rod-shaped insulating heat conductor 32B is pulled in and displaces in the direction of the arrow AL3, and, as shown in FIG. 8 (B), the interval between the two rod-shaped insulating heat conductors 32A and 32B becomes smaller by exactly the distance "d".

Figure 9:
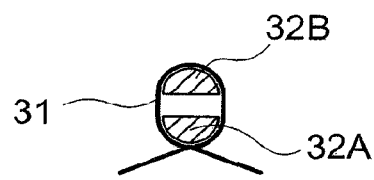
FIG. 9 This is a view of an impact drive type actuator according to a first modification of the third embodiment and similar to (A) of FIG. 8.

In the above constitution of the embodiment which is shown in FIG. 7 and FIG. 8, the rod-shaped insulating heat conductors 32A, 32B have circular cross-section columnar shapes. The wound wire-shaped shape memory alloy 31 is arranged so as to contact the circularly shaped curved outer surfaces of the rod-shaped insulating heat conductors 32A, 32B. Alternatively, the two rod-shaped insulating heat conductors 32A, 32B, as shown in FIG. 9, may be given flat surfaces at the facing surface parts and may be made substantially half circle shapes in cross-section so as to increase the contact area with the wire-shaped shape memory alloy 31 while keeping the overall size small.

Figure 10:
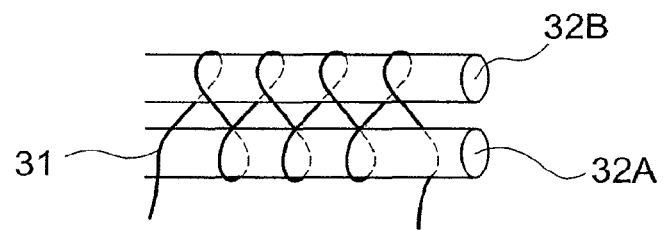
FIG. 10 This is a partial perspective view of impact drive type actuator according to a second modification of the third embodiment and shows a direction of winding of the wire-shaped shape memory alloy.
Figure 11:
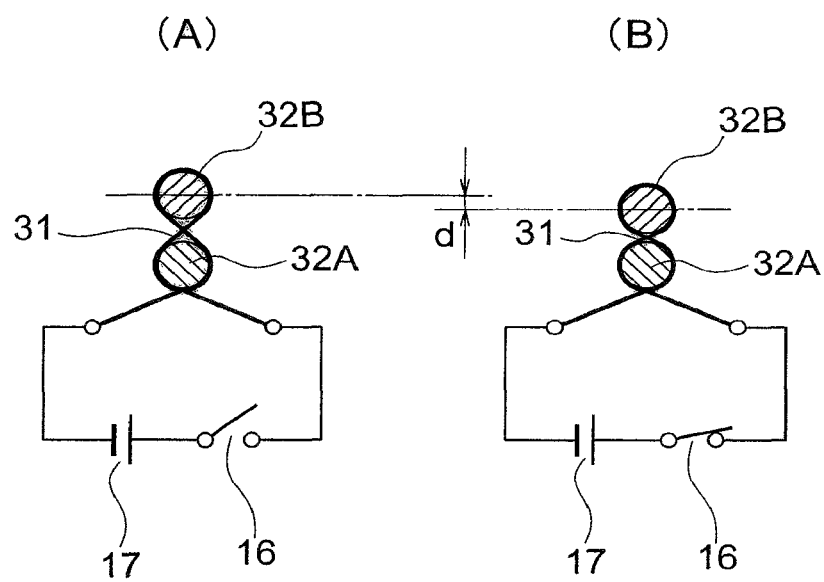
FIG. 11 This gives plan views which show a state (A) of the impact drive type actuator according to the second modification of the third embodiment when the wire-shaped shape memory alloy is at a low temperature and a state (B) where it is electrified and heated (high temperature).

Further, regarding the method of winding the wire-shaped shape memory alloy 31 around the two rod-shaped insulating heat conductors 32A, 32B, as shown in FIG. 10 and FIG. 11, a figure eight shape is also possible. In this case, it is possible to further increase the contact area between the wire-shaped shape memory alloy 31 and the rod-shaped insulating heat conductors 32A, 32B, possible to further increase the length of the wire-shaped shape memory alloy 31 as well, and possible to further increase the displacement caused.

While not shown, the two rod-shaped insulating heat conductors 32A, 32B can also function as a simple variable interval actuator since each time current is passed, the wire-shaped shape memory alloy 31 contracts and the interval between the two rods 32A, 32B is narrowed.

[Fourth Embodiment]

Figure 12:
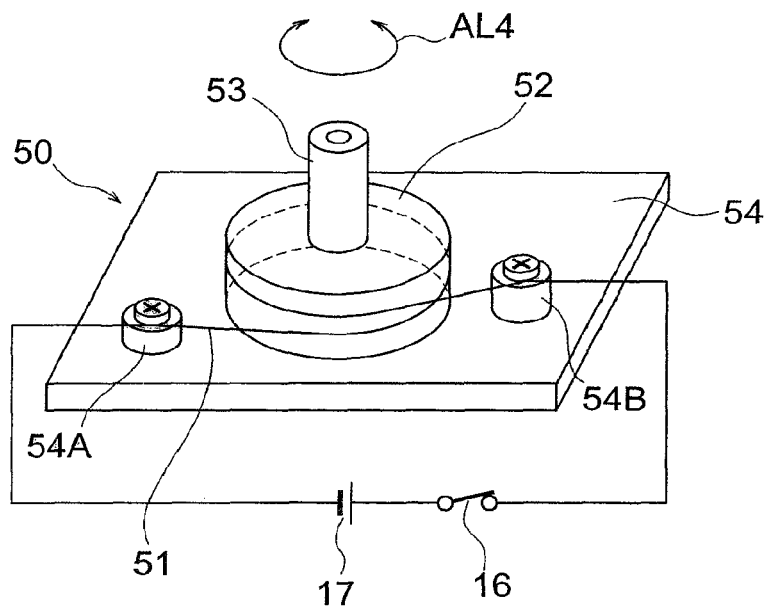
FIG. 12 This is a perspective view which shows the appearance of principal parts of an impact drive type actuator according to a fourth embodiment of the present invention.

Referring to FIG. 12, a fourth embodiment of the impact drive type actuator according to the present invention will be explained. In FIG. 12, 50 indicates an impact drive type actuator. This impact drive type actuator 50 functions as a high speed response rotation brake device. As one example of application, when a manually operated volume dial or rotary switch etc. is turned, the rotation brake action of the impact drive gives a "click" feeling. Reference numeral 51 is a wire-shaped shape memory alloy, while 52 is a rotor shaped insulating heat conductor which has a shaft 53 at its center axis (below, referred to as "rotor insulating heat conductor 52"). The top end of the shaft 53 is further extended and connected to the rotational drive part, but in the example illustrated in FIG. 12, the extended part at the top end of the shaft 53 is omitted. In the impact drive type actuator 50 of the present embodiment, the wire-shaped shape memory alloy 51 is wound by substantially one turn around the outer circumferential surface of the rotor insulating heat conductor 52. The two ends of the wire-shaped shape memory alloy 51 are fixed to fastening terminals 54A, 54B on a base member 54. Further, between the two ends of the wire-shaped shape memory alloy 51, a switch 16 and power source 17 are connected by a serial connection.

The rotor insulating heat conductor 52 is structured so as to be driven to rotate as shown by the arrow AL4 by the shaft 53 based on an external drive force. Therefore, when in a usual state where the wire-shaped shape memory alloy 51 is not electrified, the wire-shaped shape memory alloy 51 contacts the outer circumferential surface of the rotor insulating heat conductor 52, but does not strongly contact it. Therefore, the rotor insulating heat conductor 52 is in a state where it does not receive a brake action and freely rotates without constraint. If electrifying the wire-shaped shape memory alloy 52, the wire-shaped shape memory alloy 52 instantaneously contracts and strongly contacts the outer circumferential surface of the rotor insulating heat conductor 52 to tighten against the rotor insulating heat conductor 52. As a result, the rotating state rotor insulating heat conductor 52 is subjected to a strong brae force. When electrification ends, the heat which is generated at the wire-shaped shape memory alloy 51 is dispersed through the rotor insulating heat conductor 52. As a result, the wire-shaped shape memory alloy 51 returns to its original length, the tightening force ends, and the brake action is lifted.

According to the impact drive type actuator 50 according to the fourth embodiment which has this constitution, the rotor insulating heat conductor 52 which rotates due to the rotational drive force which is given from the outside through the shaft 53 is tightened against by the electrification and contraction of the wire-shaped shape memory alloy 51 which is wound around its outer circumferential surface and thereby subjected to a brake action. The intermittent instantaneous brake action on the rotor insulating heat conductor 52 based on the wire-shaped shape memory alloy 51 gives an impact to the shaft 53 and can give a "click" feeling to the operator who is turning the shaft 53.

[Fifth Embodiment]

Figure 13:
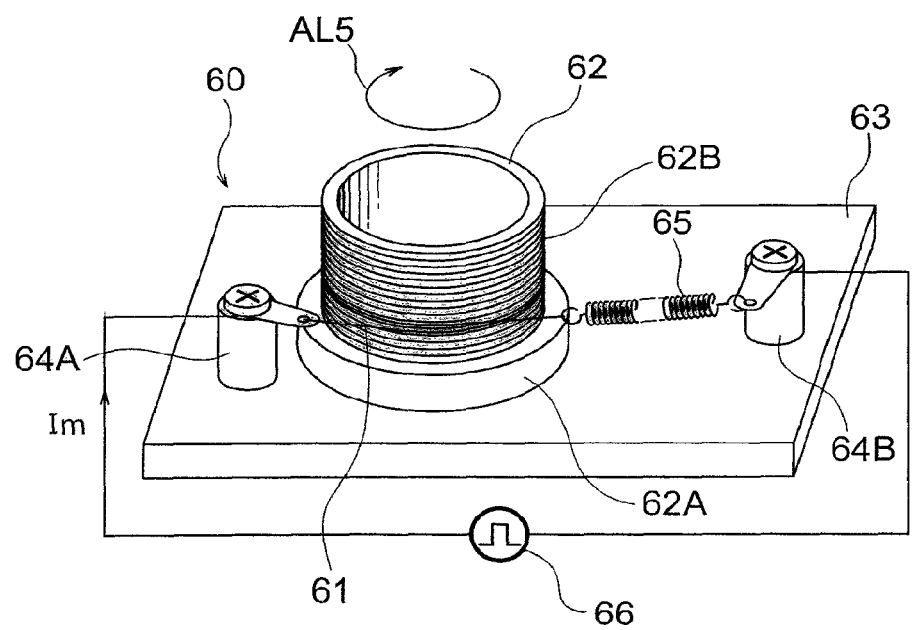
FIG. 13 This is a perspective view which shows the appearance of principal parts of an impact drive type actuator according to a fifth embodiment of the present invention.
Figure 14:
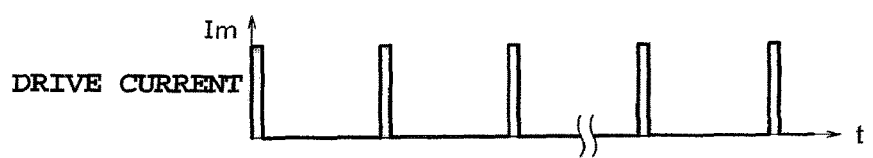
FIG. 14 This is a waveform diagram which shows a drive current which is supplied to an impact drive type actuator according to the fifth embodiment.

Referring to FIG. 13 and FIG. 14, a fifth embodiment of the impact drive type actuator according to the present invention will be explained. In FIG. 13, 60 is an impact drive type actuator. Due to this impact drive type actuator 60, a motor is realized which turns in a direction such as for example shown by the arrow AL5. The impact drive type actuator 60 is configured by a wire-shaped shape memory alloy 61 and an insulating heat conductor 62 which forms a for example hollow cylindrical shaped rotor (below, referred to as a "rotor insulating heat conductor 62"). The rotor insulating heat conductor 62 is provided so as to be able to be turned freely on the base member 63 by a rotary support mechanism 62A. The rotor insulating heat conductor 62 has a predetermined length in the axial direction and is formed with a spiral thread 62B at the surface of its outer circumference. The wire-shaped shape memory alloy 61 is arranged wound for example by one turn in contact with the groove along the thread groove of the outer circumferential surface of the rotor insulating heat conductor 62. One end of the wire-shaped shape memory alloy 61 is fastened to a fastening terminal 64A of the base member 63, while the other end is fastened through an extended coil spring member 65 to a fastening terminal 64B. Further, between the two ends of the wire-shaped shape memory alloy 61, a pulse drive device 66 is electrically connected. The wire-shaped shape memory alloy 61 is cyclically supplied with pulse current. FIG. 14 shows an example of a cyclic pulse drive current which the pulse drive device 66 outputs.

In this impact drive type actuator 60, when pulse current is given from the pulse drive device 66, the wire-shaped shape memory alloy 61 in the extended state generates heat by electrification by the pulse current and disperses the heat after that whereby it cyclically repeats a contraction action. If the wire-shaped shape memory alloy 61 contracts, it tightens against the outer circumferential surface of the rotor insulating heat conductor 62, the coil spring member 65 is pulled long, and therefore the rotor insulating heat conductor 62 turns in the direction of the arrow AL5 by exactly a predetermined angle. When not electrified, the heat of the wire-shaped shape memory alloy 61 is dispersed through the rotor insulating heat conductor 62 and the alloy extends in length. At this time, friction between the rotor insulating heat conductor 62 and the wire-shaped shape memory alloy 61 becomes smaller and the coil spring member 65 pulls back the wire-shaped shape memory alloy 61 to its original position. A predetermined angle of rotational operation of the rotor insulating heat conductor 62 is performed each time a pulse current is applied. As a result, the rotor insulating heat conductor 62 rotates in the direction of the arrow AL5. Note that when the wire-shaped shape memory alloy 61 is in the extended state, it contacts the outer surface of the rotor insulating heat conductor 62 in a loose state.

In the impact drive type actuator 60, along with rotation of the rotor insulating heat conductor 62 at the rotary support mechanism 62A, the rotor insulating heat conductor 62 moves in the axial direction. According to the impact drive type actuator 60 which has such a mechanism, for example, by attaching a camera lens inside of the hollow part of the rotor insulating heat conductor 62, the assembly can be configured as a focus adjustment mechanism of a camera lens.

In application as a focus adjustment mechanism of a camera lens, due to the spiral shaped thread 62B, rotation of the rotor insulating heat conductor 62 enables the insulating heat conductor 62 to advance and retract for a linear motion function even without another holding mechanism etc. With this constitution, it is possible to simply shorten the length of the optical axis in the camera lens direction.

[Sixth Embodiment]

Figure 15:
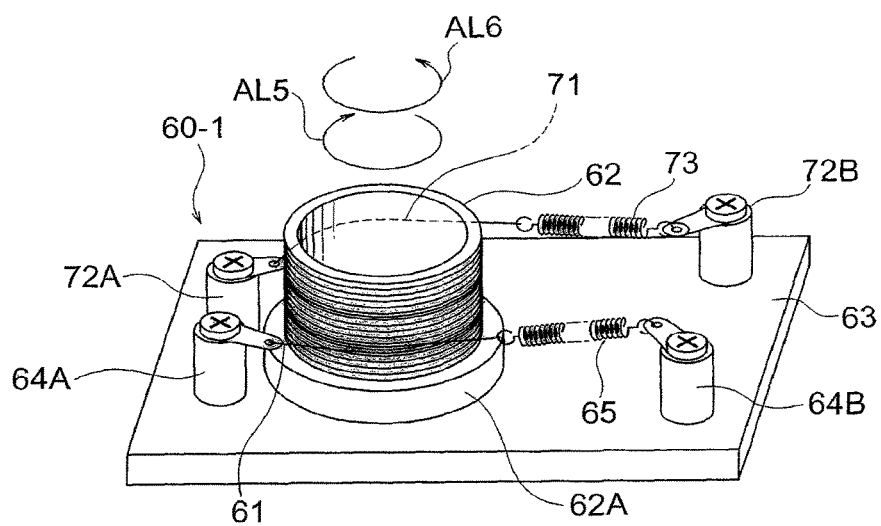
FIG. 15 This is a perspective view which shows the appearance of principal parts of an impact drive type actuator according to a sixth embodiment of the present invention.
Figure 16:
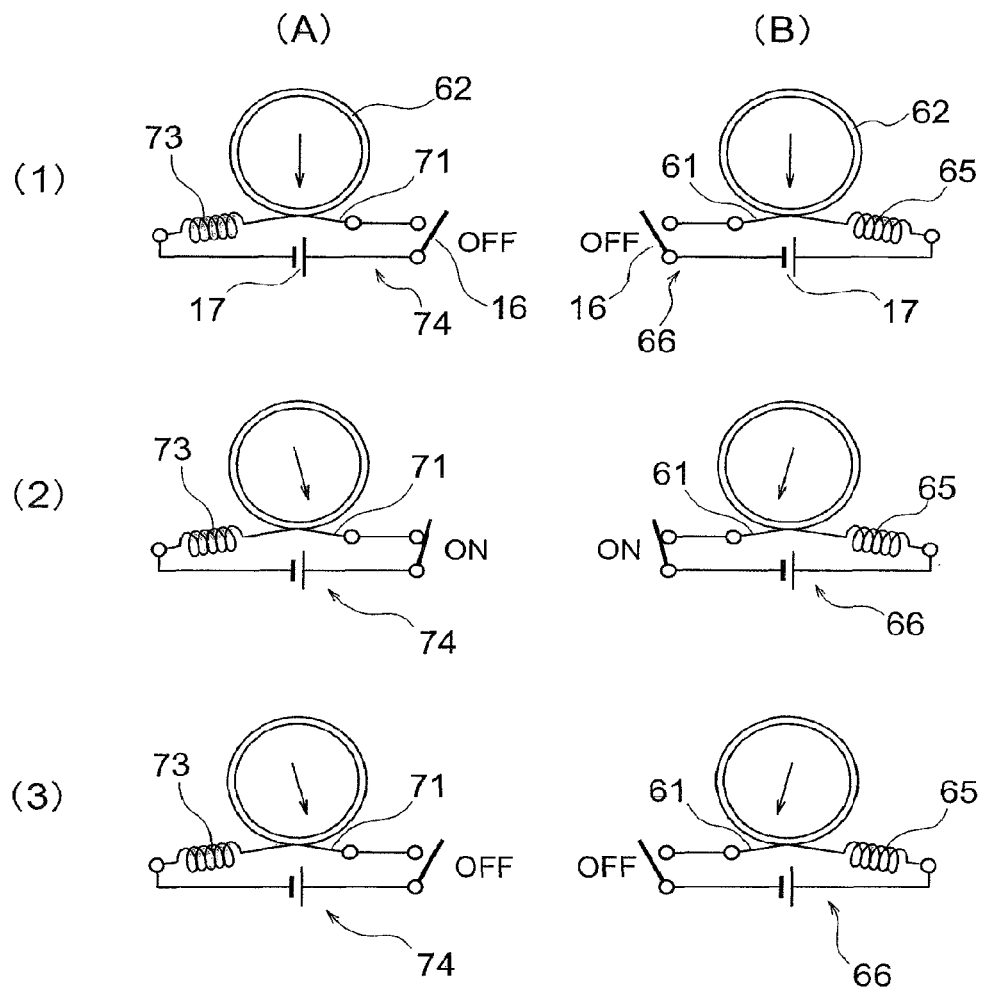
FIG. 16 This gives views for explaining a drive state (A) of a rotary operation in a counterclockwise direction by the operation characteristics of the impact drive type actuator of the sixth embodiment and a drive state (B) of a rotary operation in a clockwise direction.

Referring to FIG. 15 and FIG. 16, a sixth embodiment of the impact drive type actuator according to the present invention will be explained. This sixth embodiment is a modification of the fifth embodiment. That is, in the constitution of the impact drive type actuator 60 according to the fifth embodiment, the motor turned in a single direction, but in the constitution of the impact drive type actuator 60-1 according to the present embodiment, it is possible to realize a motor which can turn in the opposition direction as well. That is, as shown in FIG. 15, regarding the rotational operation of the rotor insulating heat conductor 61, this is configured to rotate in the rotational direction which is opposite to the rotational direction which is shown by the arrow AL5 (clockwise direction), that is, which is shown by the arrow AL6 (counterclockwise direction).

In this constitution, in addition to the constitution which was explained by FIG. 13, another wire-shaped shape memory alloy 71 is wound in the thread groove of the outer circumferential surface of the rotor insulating heat conductor 62. The winding direction of the wire-shaped shape memory alloy 71 is a winding direction which is opposite to the above-mentioned wire-shaped shape memory alloy 61. Further, the thread groove in which the wire-shaped shape memory alloy 71 is wound is separate from the thread groove in which the wire-shaped shape memory alloy 61 is wound, that is, the two are set so as not to become the same. In other words, the two wire-shaped shape memory alloys 61, 71 are arranged in thread grooves so as not to contact each other.

One end part of the wire-shaped shape memory alloy 71 is fastened to the fastening terminal 72A of the base member 63, while the other end part is fastened to the fastening terminal 72B through the extended coil spring member 73. Further, between the two ends of the wire-shaped shape memory alloy 71, another pulse drive device (not shown) is electrically connected whereby the wire-shaped shape memory alloy 71 is cyclically supplied with pulse current. The other pulse drive device is a device similar to the above-mentioned pulse drive device 66. By the other pulse drive device outputting a pulse signal, the wire-shaped shape memory alloy 71 is cyclically made to contract and the rotor insulating heat conductor 62 is made to rotate in the direction of the arrow AL6.

FIG. 16 shows the rotational operation of the rotor insulating heat conductor 62, that is, rotational operation in the direction of the arrow AL6 (counterclockwise direction) (A) and rotational operation in the direction of the arrow AL5 (clockwise direction) (B). In the two rotational operations (A), (B), pulse drive devices 66, 74 comprised of a switch 16 and power source 17 are used to supply pulse current. When the switch 16 is turned off, pulse current is run. Due to this, the wire-shaped shape memory alloys 61, 71 change in state from the extended state (1) to the contracted state (2) and again to the extended state (3) as a result of which rotational drive is performed. When the wire-shaped shape memory alloys 61, 71 are in the extended state, the wire-shaped shape memory alloys 61, 71 gently contact the outer circumferential surface of the rotor insulating heat conductor 62. When the wire-shaped shape memory alloys 61, 71 in the extended state are electrified and become the contracted state, the wire-shaped shape memory alloys 61, 71 tighten against the outer circumferential surface of the rotor insulating heat conductor 62, the coil spring members 65, 73 extend, and a predetermined angle of rotation occurs in the respectively set directions. By repeating the supply of pulse current, the extended state (1), the contracted state (2), and the extended state (3) are repeated and rotation is performed. Either of the contraction operation by the wire-shaped shape memory alloy 61 and the contraction operation by the wire-shaped shape memory alloy 71 is selectively performed.

Figure 17:
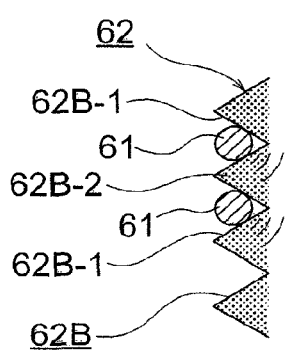
FIG. 17 This is a partial cross-sectional view which shows an engagement relationship of the wire-shaped shape memory alloy and a thread part of an outer circumferential surface of a rotor insulating heat conductor in the impact drive type actuator of the sixth embodiment.

FIG. 17 shows the engagement relationship between the rotor insulating heat conductor 62 and the wire-shaped shape memory alloy 61 (or 71) in the impact drive type actuators 60, 60-1 which function as rotary motors. The wire-shaped shape memory alloy 61 (or 71) is arranged in the thread grooves 62B-1 of the spiral shaped thread 62B which is formed at the outer circumferential surface of the rotor insulating heat conductor 62. The rotor insulating heat conductor 62 is formed by an insulating material. For example, as shown in FIG. 17, the wire-shaped shape memory alloy 61 (or 71) is present inside different thread grooves 62B-1 and there is a thread turn 62B-2 between the two, so the wire-shaped shape memory alloys 61 (or 71) are separated and will never short-circuit in state. The wire-shaped shape memory alloy 61 (or 71) firmly contacts the rotor insulating heat conductor 62 inside of the thread grooves 62B-1, so efficient heat dispersion is possible. The wire-shaped shape memory alloy 61 acting in the right direction (AL5) and the wire-shaped shape memory alloy 71 acting in the left direction (AL6) are wound several turns apart so that the wires do not hit each other since the spiral thread 62B of the rotor insulating heat conductor 62 is cut with a large number of thread turns.

[Seventh Embodiment]

Figure 18:
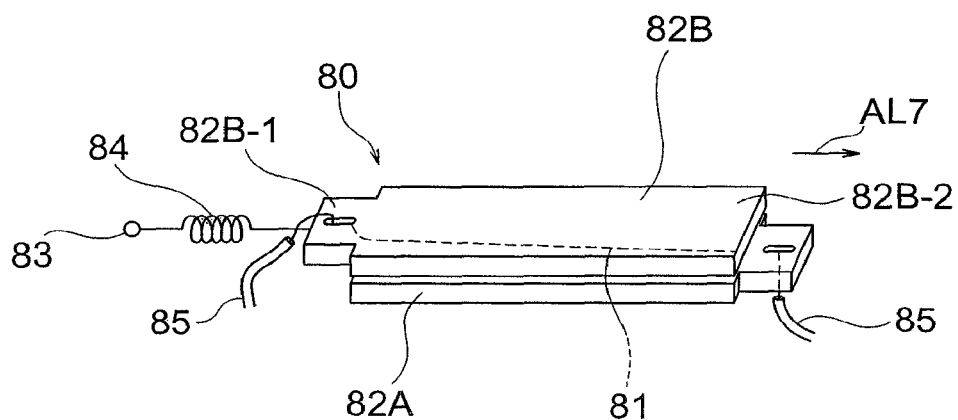
FIG. 18 This is a perspective view which shows the appearance of principal parts of an impact drive type actuator according to a seventh embodiment of the present invention.
Figure 19:
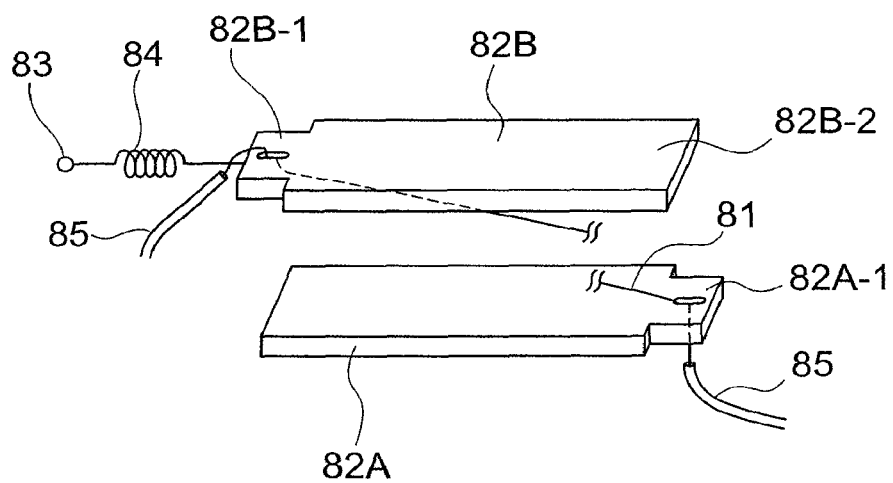
FIG. 19 This is a partial cross-sectional view which shows a relationship of two plate-shaped insulating heat conductors and a wire-shaped shape memory alloy in the impact drive type actuator according to the seventh embodiment.

Referring to FIG. 18 and FIG. 19, a seventh embodiment of the impact drive type actuator according to the present invention will be explained. In FIG. 18, 80 indicates an impact drive type actuator. This impact drive type actuator 80 is for example a linear movement type actuator in which a moving member moves in the direction such as shown by the arrow AL7. The impact drive type actuator 80 is comprised of a wire-shaped shape memory alloy 81 and two rectangular plate-shaped insulating heat conductors 82A, 82B which are arranged in parallel and overlaid (below, referred to as "the plate-shaped insulating heat conductors 82A, 82B"). The bottom side plate-shaped insulating heat conductor 82A is fixed in place and is used as a fixed member. The top side plate-shaped insulating heat conductor 82B has one end 82B-1 connected through a tensed coil spring member 84 to a fastening terminal part 83 and the other end 82B-2 as a free end. The plate-shaped insulating heat conductor 82B is arranged so as to be able to move in the long direction of the plate-shaped insulating heat conductor 82A (direction of the arrow AL7) in the state substantially overlaying the fixed plate-shaped insulating heat conductor 82A. The wire-shaped shape memory alloy 81, as shown in FIG. 19, is arranged in the space between the two overlaid plate-shaped insulating heat conductors 82A, 82B and is connected to one end 82A-1 of the plate-shaped insulating heat conductor 82A and one end 82B-1 of the plate-shaped insulating heat conductor 82B. In the usual state not electrified, the wire-shaped shape memory alloy 81 is in the extended state. Therefore, the wire-shaped shape memory alloy 81 which is connected to the one end 82A-1 of the plate-shaped insulating heat conductor 82A and the one end 82B-1 of the plate-shaped insulating heat conductor 82B is in the extended state since the end 82B-1 is pulled by the coil spring member 84. If the wire-shaped shape memory alloy 11 is intermittently electrified, the wire-shaped shape memory alloy 11 contracts and the top side plate-shaped insulating heat conductor 82B instantaneously moves in the direction of the arrow AL7 against the action of the coil spring member 84. Between the two ends of the wire-shaped shape memory alloy 11, a drive circuit is electrically connected. Reference numeral 85 indicates electrical wiring for electrification use. The top side plate-shaped insulating heat conductor 82B functions as a moving member.

The impact drive type actuator 80, as explained below, places the moving member on the moving member constituted by the plate-shaped insulating heat conductor 82B, so is utilized as a linear movement type actuator which makes the moving member move.

[Eighth Embodiment]

Figure 20:
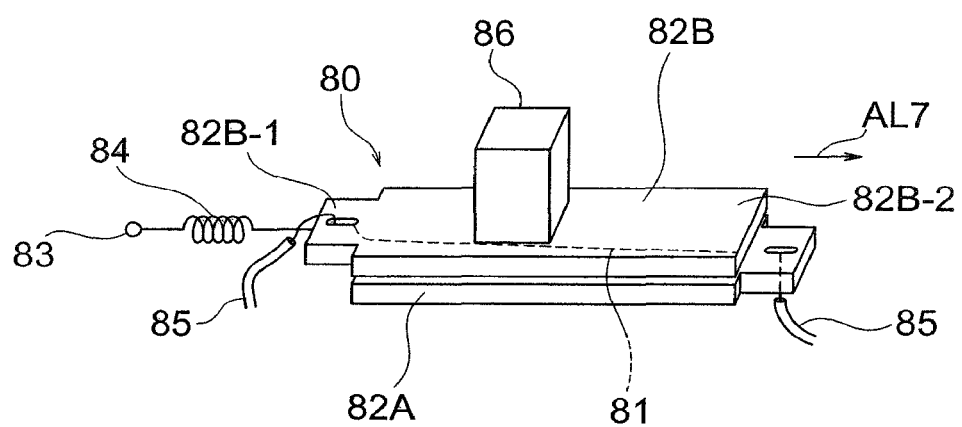
FIG. 20 This is a perspective view which shows the appearance of principal parts of an impact drive type actuator according to an eighth embodiment of the present invention.
Figure 21:
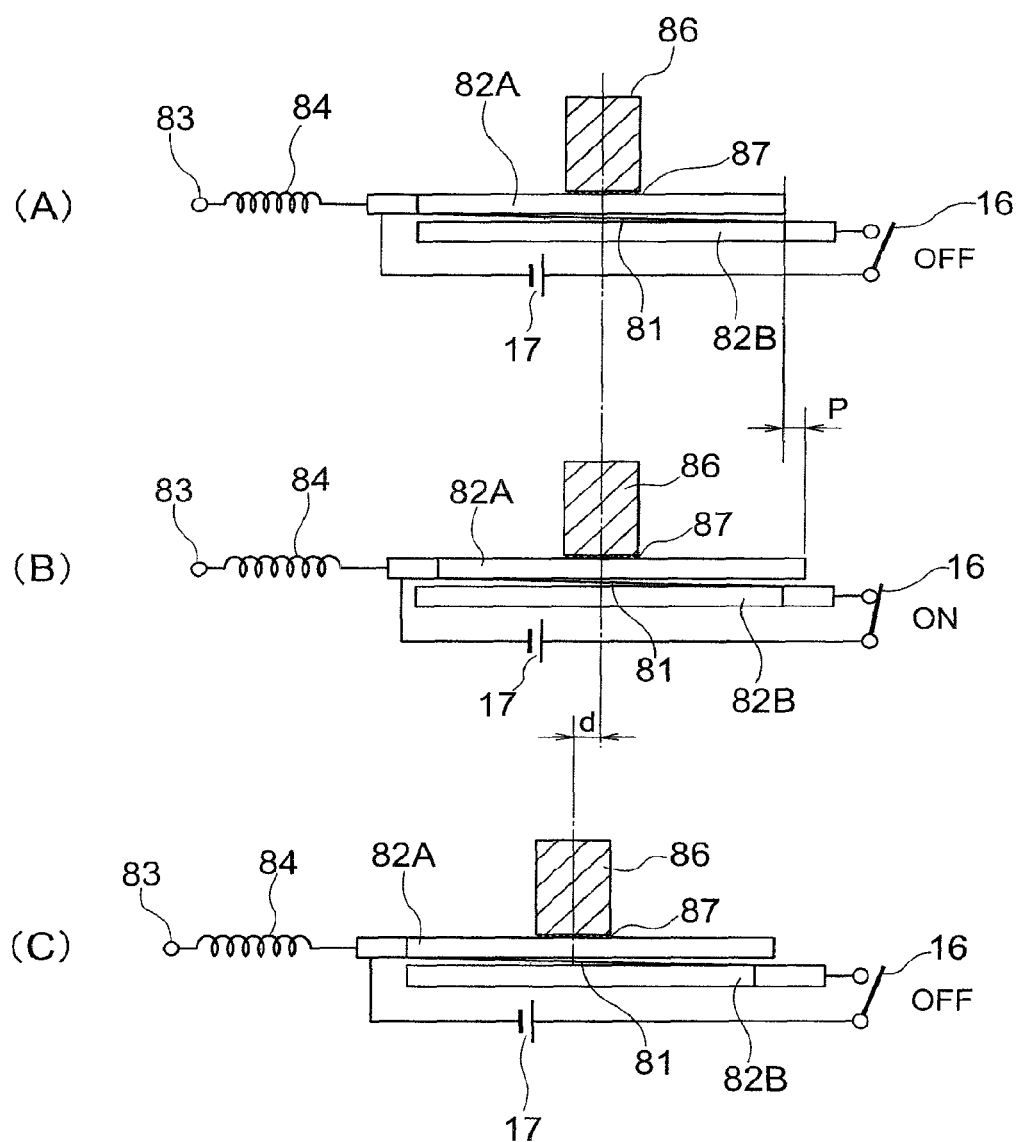
FIG. 21 This gives views which explain a linear drive operation by an impact drive type actuator according to the eighth embodiment.

Referring to FIG. 20 and FIG. 21, an eighth embodiment of the impact drive type actuator according to the present invention will be explained. This embodiment is configured based on the impact drive type actuator enabling linear movement of a moving member which was explained in FIG. 18. By placing the moving member 86 on the moving member constituted by the plate-shaped insulating heat conductor 82B, the moving member 86 is made to move linearly. The other parts of the constitution are the same as the constitution which is explained by FIG. 18. In the above constitution which is shown in FIG. 20, components which are the same as components which are shown in FIG. 18 are assigned the same reference numerals.

The box-shaped moving member 86 which is placed on the moving member constituted by the plate-shaped insulating heat conductor 82B is placed constrained in movement direction so as to be able to move linearly only along the long direction of the plate-shaped insulating heat conductor 82B. Between the top surface of the plate-shaped insulating heat conductor 82B and the bottom surface of the moving member 86, a friction part 87 is formed.

Next, referring to FIG. 21, the linear type movement of the moving member based on the impact drive type actuator 80 according to the present embodiment will be explained.

The state of FIG. 21(A) is the state where, in the drive circuit constituted by the switch 16 and the power source 17, the switch 16 is off in state. Therefore, the upper side plate-shaped insulating heat conductor 82B is pulled by the coil spring member 84 and the wire-shaped shape memory alloy 81 extends in state.

In the state of FIG. 21(B), the switch 16 is rapidly turned on and the wire-shaped shape memory alloy 81 is electrified in a pulse like manner whereby the wire-shaped shape memory alloy 11 instantaneously contracts. As a result, the plate-shaped insulating heat conductor 82B instantaneously displaces in the direction of the arrow AL7 by exactly P against the coil spring member 84. Even if the plate-shaped insulating heat conductor 82B displaces, the moving member 86 on the plate-shaped insulating heat conductor 82B slides on the friction part 87 due to inertia, so the moving member 86 is not displaced and the moving member 86 remains at its position.

If, after that, in the state of FIG. 21(C), the switch 16 is turned off and the alloy is no longer electrified, the wire-shaped shape memory alloy 81 disperses its heat and slowly returns to its original length (extended state). The position of the plate-shaped insulating heat conductor 82B also is pulled by friction by the coil spring member 84 to return to its original position. As a result, the position of the moving member 86 also changes along with movement of the plate-shaped insulating heat conductor 82B. At this time, the moving member 86 finally moves by exactly the distance "d" in the left direction in the figure.

If cyclically electrifying the wire-shaped shape memory alloy to repeat this change of state, it is possible to make the moving member 86 move linearly in the left direction in the figure.

According to the impact drive type actuator 80 for linear movement use according to the present embodiment, it is possible to increase the amount of movement per operation compared with a linear actuator using a piezoelectric device, possible to greatly lower the drive frequency, and possible to realize a linear movement type actuator by a low cost, simple drive circuit constitution.

Figure 22:
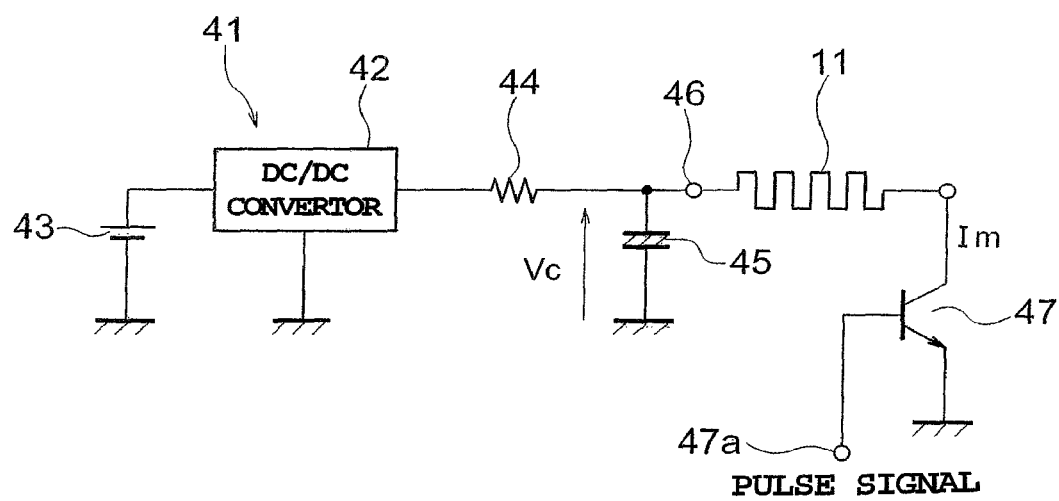
FIG. 22 This is a diagram of an electrical circuit which is used in the impact drive type actuator according to the present invention.

Next, the drive circuit for contraction and extension of the above-mentioned wire-shaped shape memory alloys 11, 21, 31, 51, 61, 71, and 81 (below, referred to as "the wire-shaped shape memory alloy 11 etc.") will be explained with reference to FIG. 22 and FIG. 23. The wire-shaped shape memory alloy 11 etc. intermittently contracts based on the pulse-like electrification given from the drive circuit 41. The drive circuit 41 is comprised of a DC/DC converter 42, battery 43, charging resistor 44, and discharge use capacitor 45. The drive circuit 41 converts the DC voltage which is supplied by the battery 43 at the DC/DC converter 42 to generate, for example, a boosted predetermined DC voltage. The drive circuit 41 is a specific circuit configuration of the power source 17. Reference numeral 46 indicates the output end of the drive circuit 41. At the output end 46, as a load, one end of the wire-shaped shape memory alloy 11 etc. is connected. At the other end of the wire-shaped shape memory alloy 11 etc., a switching transistor 47 is connected with the ground. The switch transistor 47 corresponds to the above-mentioned switch 16. The switching transistor 47 is supplied with a pulse signal at the control terminal 47a which is connected to the base. By the switching transistor 47 being supplied with the control signal, the switching transistor 47 instantaneously turns on and current Im flows, whereby the wire-shaped shape memory alloy 11 etc. is instantaneously electrified. By the base of the switching transistor 47 being supplied with the pulse signal, the wire-shaped shape memory alloy 11 etc. is intermittently supplied with current each time.

Figure 23:
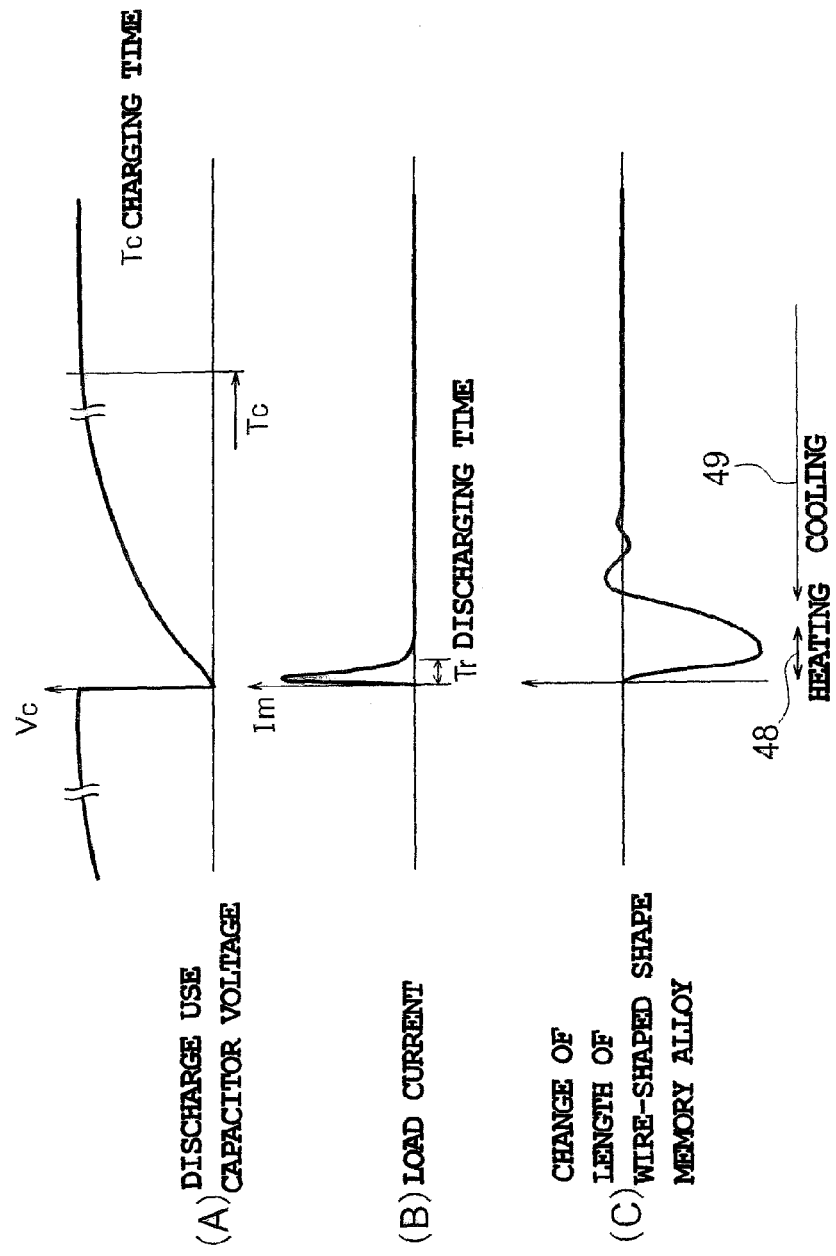
FIG. 23 This is a waveform diagram which shows the operations of the parts of the drive circuit.

FIG. 23 shows the change characteristics (A) of the voltage of the discharge use capacitor 45 at the drive circuit 41, the change characteristics (B) of the load current Im, and the change characteristics (C) of the length of the wire-shaped shape memory alloy 11. In the change characteristics (C) of the length of the wire-shaped shape memory alloy 11 etc., the range 48 becomes the range at the time of heating while the range 49 becomes the range at the time of cooling. To maintain the cooling time at the wire-shaped shape memory alloy 11 long, the electrification time of the wire-shaped shape memory alloy 11 etc. is made short and the off time is made long. Further, to shorten the electrification time as much as possible, the drive circuit 41 uses a high voltage (for example 20V) and a large current (for example, the peak current 2A) as output to drive the wire-shaped shape memory alloy 11. Note that, in accordance with the conditions which are sought in the design of the impact drive type actuator, the drive circuit 41 may be configured so as to directly drive the wire-shaped shape memory alloy 11 etc. by pulse-like electrification from the input voltage of the battery when the battery 43 has a current supply ability. In this case, the DC/DC converter 42, charging resistor 44, and discharge use capacitor 45 become unnecessary and the drive circuit 41 can be simplified.

To improve the response speed of the wire-shaped shape memory alloy 11 etc. to make it intermittently contract or extend, it is necessary to increase the cooling time as much as possible. For this reason, to shorten the electrification time in such a limited time period, it is necessary to shorten the pulse duty (electrification time/cycle) and increase the wave height. For this reason, a voltage greater than the voltage of the battery 43 becomes necessary, so a DC/DC converter 41 is used for boosting the voltage. Further, the discharge use capacitor 45 is charged to a high voltage and the switching transistor 47 turned ON so as to make the charge which is stored in the discharge use capacitor 45 be discharged all at once in the form of current. This time is the discharge time Tr. The resistance value of the wire-shaped shape memory alloy 11 etc. is low, so the current Im instantaneously flows.

The current Im flows through the wire-shaped shape memory alloy 11 etc. instantaneously whereby the wire-shaped shape memory alloy itself is heated and the wire-shaped shape memory alloy 11 etc. contact so as to strongly contact the insulating heat conductor. The current is instantaneous, so when the wire-shaped shape memory alloy 11 etc. abuts against the insulating heat conductor, the current flowing becomes substantially zero. For this reason, even if the insulating property of the insulating heat conductor deteriorates, no short-circuit state will result and no large current will continue to flow, so the circuit becomes safe.

Above, a wire-shaped shape memory alloy was explained, but the cross-section need not be round. The alloy may also be made one with a square cross-sectional shape.

The configurations, shapes, sizes, and relative layouts explained in the above embodiments are only shown schematically to an extent enabling the present invention to be understood and worked. Further, the numerical values and compositions (materials) of the constitutions etc. are only illustrations. Therefore, the present invention is not limited to the embodiments explained above and can be changed in various ways so long as not departing from the scope of the technical ideas shown in the claims.

INDUSTRIAL APPLICABILITY

The impact drive type actuator according to the present invention is configured utilizing the extension and contraction action of a wire-shaped shape memory alloy. After being electrified to generate heat, it utilizes the heat dispersion action of a disk-shaped insulating heat conductor etc. to lower the temperature so as to improve the response. This is utilized as a highly practical impact drive type actuator. Furthermore, it is used as the drive mechanism of a rotary motor or a linear motor.

EXPLANATION OF REFERENCES 10 impact drive type actuator
11 wire-shaped shape memory alloy
12 disk-shaped insulating heat conductor
13 base member
14 elastic mechanism
14c coil spring member
15 screw
16 switch
17 power source
20 impact drive type actuator
21 wire-shaped shape memory alloy
22 round rod-shaped insulating heat conductor
22A fixed side round rod-shaped insulating heat conductor
22B moving side round rod-shaped insulating heat conductor
23A plate member
23B plate member
30 impact drive type actuator
31 wire-shaped shape memory alloy
32A rod-shaped insulating heat conductor
32B rod-shaped insulating heat conductor
33 base member
34 support plate
35 coil spring member
36 fastening terminal
37 electric terminal
41 drive circuit
42 DC/DC converter
44 charging resistor
45 discharge capacitor
47 switching transistor
50 impact drive type actuator
51 wire-shaped shape memory alloy
52 rotor insulating heat conductor
53 shaft
54 base member
60 impact drive type actuator
60-1 impact drive type actuator
61 wire-shaped shape memory alloy
62 rotor insulating heat conductor
63 base member
65 coil spring member
66 pulse drive device
71 wire-shaped shape memory alloy
73 coil spring member
80 impact drive type actuator
81 wire-shaped shape memory alloy
82A plate-shaped insulating heat conductor
82B plate-shaped insulating heat conductor
84 coil spring member
86 moving member
101 first component member
102 second component member

The invention claimed is:

1. An impact drive type actuator comprising:
a wire-shaped shape memory alloy which contracts upon being electrified and heated,
an insulating heat conductor which contacts said wire-shaped shape memory alloy and releases the heat which is generated at said wire-shaped shape memory alloy, and
a drive circuit which instantaneously electrifies said wire-shaped shape memory alloy to make said wire-shaped shape memory alloy contract, wherein
said insulating heat conductor is formed as a rotor which is provided freely rotatably,
said wire-shaped shape memory alloy is provided contacting and winding around the circumferential surface of said insulating heat conductor and is fastened at its two ends, and
said wire-shaped shape memory alloy tightens against said insulating heat conductor and brakes rotational operation of the insulating heat conductor when said wire-shaped shape memory alloy is electrified and contracts, and the wire-shaped shape memory alloy contacts said insulating heat conductor closely to be made to extend by instantaneous dispersion of heat which is stored by being electrified, and thereby the braking operation by the tightening is removed and repetition of sequential operations of the contracting and extending gives said insulating heat conductor as the rotor a click feeling.

2. An impact drive type actuator comprising:
a wire-shaped shape memory alloy which contracts upon being electrified and heated.
an insulating heat conductor which contacts said wire-shaped shape memory alloy and releases the heat which is generated at said wire-shaped shape memory alloy, and a drive circuit which instantaneously electrifies said wire-shaped shape memory alloy to make said wire-shaped shape memory contract, and wherein said insulating heat conductor is formed as a rotor which is provided freely rotatably with a circumferential surface formed with a spiral shaped groove, said wire-shaped shape memory alloy is provided contacting and winding around the inside of said groove at the circumferential surface of said insulating heat conductor and one end of the wire-shaped shape memory alloy being fixed and the other end being supported by an elastic mechanism to be tensed, said wire-shaped shape memory alloy making said insulating heat conductor rotate when the wire-shaped shape memory alloy is electrified and contracts, said wire-shaped shape memory alloy winds around said insulating, heat conductor and displaces it rotatably when it is electrified and contracts, and contacts said insulating heat conductor closely to be made to extend by instantaneous dispersion of heat which is stored by being electrified, said insulating heat conductor is rotated to a former position by said elastic mechanism and repetition of sequential operations of the contracting and extending makes said insulating heat conductor rotate.

3. The impact drive type actuator as set forth in claim 2, further comprising:

a second wire-shaped shape memory alloy which is separated from said wire-shaped shape memory alloy, said second wire-shaped shape memory alloy, contacting the inside of said groove at the circumferential surface of said insulating heat conductor and winding in a direction opposite to a winding direction of said wire-shaped shape memory alloy, one end of the second wire-shaped memory alloy being fixed and the other end being supported by a second elastic mechanism to be tensed, and said wire-shaped shape memory alloy makes said insulating heat conductor turn in one direction when it is electrified and contracts while said second wire-shaped shape memory alloy makes said insulating heat conductor turn in an opposite direction to said one direction when said second wire-shaped shape memory alloy is electrified and contracts.

4. The impact drive type actuator as set forth in claim 2 wherein said spiral shaped groove which is formed at the circumferential surface of said insulating heat conductor is structured so that said wire-shaped shape memory alloy does not contact itself.

5. An impact drive type actuator comprising:

a wire-shaped shape memory alloy which contracts upon being electrified and heated.

two insulating heat conductors which contact said wire-shaped memory alloy and release the heat which is generated at said wire-shaped shape memory alloy, each of said insulating heat conductors having a plate-shaped form, and a drive circuit which instantaneously electrifies said wire shaped shape memory alloy to make said wire-shaped shape memory contract, wherein, the two plate-shaped insulating heat conductors are arranged facing each other, one of said plate-shaped insulating heat conductors being fixed in place, the other of said plate-shaped insulating heat conductors being arranged to be freely movable and being provided to be pulled in one direction by an elastic mechanism, said wire-shaped shape memory alloy is arranged between said two plate-shaped insulating heat conductors so that said wire shaped shape memory alloy connects said two plate-shaped insulating heat conductors, and said wire-shaped shape memory alloy makes said freely movable plate-shaped insulating heat conductor displace by exactly a predetermined distance against said elastic mechanism when it is electrified and contracts.

6. The impact drive type actuator as set forth in claim 5, further comprising a moving member arranged on top of said freely movable plate-shaped insulating heat conductor in a friction contact state and said freely movable plate-shaped insulating heat conductor is repeatedly made to displace whereby said moving member is made to move in one direction.

* * * * *